(12) United States Patent
Wang

(10) Patent No.: US 12,348,991 B2
(45) Date of Patent: Jul. 1, 2025

(54) MEASUREMENT INTERVAL CONFIGURATION METHOD AND DEVICE, TERMINAL, AND NETWORK DEVICE

(71) Applicant: GUANGDONG OPPO MOBILE TELECOMMUNICATIONS CORP., LTD., Guangdong (CN)

(72) Inventor: Shukun Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 217 days.

(21) Appl. No.: 17/486,119

(22) Filed: Sep. 27, 2021

(65) Prior Publication Data
US 2022/0046450 A1     Feb. 10, 2022

Related U.S. Application Data

(63) Continuation of application No. PCT/CN2019/079944, filed on Mar. 27, 2019.

(51) Int. Cl.
*H04W 24/08*     (2009.01)
*H04W 8/24*     (2009.01)
(Continued)

(52) U.S. Cl.
CPC ............ *H04W 24/08* (2013.01); *H04W 8/24* (2013.01); *H04W 24/10* (2013.01); *H04W 36/00698* (2023.05)

(58) Field of Classification Search
CPC ..................................................... H04W 24/08
See application file for complete search history.

(56) References Cited

U.S. PATENT DOCUMENTS

| 8,750,807 B2 * | 6/2014 | Lin ....................... H04W 24/10 455/67.11 |
| 10,243,704 B2 * | 3/2019 | Yiu ........................ H04L 5/001 |

(Continued)

FOREIGN PATENT DOCUMENTS

| CN | 102572917 A | 7/2012 |
| CN | 108366379 A | 8/2018 |

(Continued)

OTHER PUBLICATIONS

Second Office Action of the Chinese application No. 202111123212.5, issued on Apr. 15, 2023. 13 pages with English translation.
(Continued)

*Primary Examiner* — Guang W Li
(74) *Attorney, Agent, or Firm* — Perkins Cole LLP

(57) ABSTRACT

A method for configuring a measurement gap includes: a terminal receives first configuration information from a network device, the first configuration information being used for determining a measurement gap corresponding to capability information of the terminal, where the capability information of the terminal is used for indicating at least one of whether the terminal supports capability of performing independent gap measurement within different frequency ranges or whether the terminal supports capability of no measurement gap, and the first configuration information includes first indication information used for indicating no measurement gap.

11 Claims, 8 Drawing Sheets

---

A network device sends first configuration information to a terminal, the terminal receives the first configuration information from the network device, the first configuration information being used for determining a measurement gap corresponding to capability information of the terminal, where the capability information of the terminal is used for indicating whether the terminal supports capability of performing independent gap measurement within different frequency ranges

301

(51) Int. Cl.
*H04W 24/10* (2009.01)
*H04W 36/00* (2009.01)

(56) References Cited

U.S. PATENT DOCUMENTS

| | | | | |
|---|---|---|---|---|
| 11,664,951 | B2* | 5/2023 | Yiu | H04L 5/0007 370/329 |
| 2011/0237202 | A1* | 9/2011 | Uemura | H04W 36/0088 455/67.14 |
| 2012/0178465 | A1* | 7/2012 | Lin | H04W 24/10 455/450 |
| 2013/0308481 | A1* | 11/2013 | Kazmi | H04W 24/02 370/252 |
| 2014/0301229 | A1* | 10/2014 | Wu | H04W 24/10 370/252 |
| 2015/0327104 | A1* | 11/2015 | Yiu | H04W 36/0088 455/450 |
| 2015/0358849 | A1* | 12/2015 | Cave | H04W 24/02 370/252 |
| 2016/0295583 | A1* | 10/2016 | Kazmi | H04W 76/15 |
| 2018/0034598 | A1* | 2/2018 | Yiu | H04W 36/0094 |
| 2019/0173634 | A1* | 6/2019 | Teyeb | H04W 24/10 |
| 2020/0014523 | A1* | 1/2020 | Huang | H04L 5/001 |
| 2020/0120691 | A1* | 4/2020 | Siomina | H04L 27/26025 |
| 2020/0154296 | A1* | 5/2020 | Siomina | H04W 24/10 |
| 2020/0163036 | A1* | 5/2020 | Fan | H04W 48/16 |
| 2020/0170062 | A1 | 5/2020 | Yang et al. | |
| 2020/0244409 | A1* | 7/2020 | Yiu | H04W 24/10 |
| 2021/0367741 | A1* | 11/2021 | Yiu | H04L 5/0007 |
| 2022/0046450 | A1* | 2/2022 | Wang | H04W 8/24 |
| 2022/0086752 | A1* | 3/2022 | Cui | H04W 8/24 |
| 2023/0115464 | A1* | 4/2023 | He | H04W 24/10 370/329 |

FOREIGN PATENT DOCUMENTS

| | | |
|---|---|---|
| WO | 2019028850 A1 | 2/2019 |
| WO | 2019031768 A1 | 2/2019 |

OTHER PUBLICATIONS

Second Office Action of the European application No. 19921976.7, issued on Jun. 2, 2023. 12 pages.
Samsung, "Measurement Gap Configuration for EN-DC", 3GPP TSG-RAN WG2 Meeting#NR AdHoc R2-1800625, Vancouver, Canada, Jan. 22-Jan. 26, 2018. 4 pages.
Supplementary European Search Report in the European application No. 19921976.7, mailed on Feb. 15, 2022. 18 pages.
Written Opinion of the International Search Authority in the international application No. PCT/CN2019/079944, mailed on Dec. 4, 2019. 7 pages with English translation.
First Office Action of the European application No. 19921976.7, issued on Dec. 6, 2022. 16 pages.
Nokia et al. "Consideration on Measurement Configuration in NE-DC" 3GPP TSG-RAN WG2 Meeting#103 R2-1812710, Aug. 10, 2018(Aug. 10, 2018), sections 1-5.
International Search Report in the international application No. PCT/CN2019/079944, mailed on Dec. 4, 2019.
"Technical Specification Group Radio Access Network; NR; Radio Resource Control (RRC) protocol specification (Release 16)", 3GPP TS 38.331 V16.4.1 (Mar. 2021).
"Technical Specification Group Radio Access Network; NR; Requirements for support of radio resource management (Release 16)", 3GPP TS 38.133 V16.8.0 (Jun. 2021).
ZTE Corporation et al: "Discussion on the configuration of measurement gap", 3GPP Draft; R2-1712602 Discussion on the Configuration of Measurement Gap, 3rd Generation Partnership Project (3GPP), Mobile Competence Centre; 650, Route Des Lucioles; F-06921 Sophia-Antipolis Cede, vol. RAN WG2, No. Reno, USA; Nov. 27, 2017-Dec. 1, 2017, Nov. 16, 2017 (Nov. 16, 2017), XP051371180, the whole document, 11 pages.
Third Office Action of the European application No. 19921976.7, issued on Nov. 30, 2023. 14 pages.
Fourth Office Action of the European application No. 19921976.7, issued on Jun. 3, 2024. 12 pages.
Fifth Office Action of the European application No. 19921976.7, issued on Jan. 7, 2025, 15 pages.

* cited by examiner

A network device sends first configuration information to a terminal, the terminal receives the first configuration information from the network device, the first configuration information being used for determining a measurement gap corresponding to capability information of the terminal, where the capability information of the terminal is used for indicating whether the terminal supports capability of performing independent gap measurement within different frequency ranges ⎯⎯ 301

FIG. 3

MEASUREMENT INTERVAL CONFIGURATION METHOD AND DEVICE, TERMINAL, AND NETWORK DEVICE

CROSS-REFERENCE TO RELATED APPLICATION

The application is a continuation application of PCT Application No. PCT/CN2019/079944 filed on Mar. 27, 2019, the disclosure of which is hereby incorporated by reference in its entity.

TECHNICAL FIELD

Embodiments of the present disclosure relate to the technical field of mobile communications, and more particularly, to a method and device for configuring a measurement gap, a terminal, and a network device.

BACKGROUND

The Measurement Gap (MG) is used to create a small gap where a terminal measures a target cell. There are two types of measurement gaps configured by the network side: a measurement gap for User Equipment (UE), referred to as per-UE measurement gap; and a measurement gap for a Frequency Range (FR), referred to as per-FR measurement gap, where the measurement gap for the FR includes a measurement gap for FR1 and a measurement gap for FR2. Regardless of the configuration for per-UE measurement gap or the configuration for per-FR measurement gap, the configured gap pattern needs to be improved.

SUMMARY

Embodiments of the present application provide a method and device for configuring a measurement gap, a terminal, and a network device.

A method for configuring a measurement gap provided by embodiments of the present disclosure includes: a terminal receives first configuration information from a network device, the first configuration information being used for determining a measurement gap corresponding to capability information of the terminal, where the capability information of the terminal is used for indicating at least one of whether the terminal supports capability of performing independent gap measurement within different frequency ranges or whether the terminal supports capability of no measurement gap, and the first configuration information includes first indication information used for indicating no measurement gap.

A method for configuring a measurement gap provided by embodiments of the present disclosure includes: a network device sends first configuration information to a terminal, the first configuration information being used for determining a measurement gap corresponding to capability information of the terminal, where the capability information of the terminal is used for indicating at least one of whether the terminal supports capability of performing independent gap measurement within different frequency ranges or whether the terminal supports capability of no measurement gap, and the first configuration information includes first indication information used for indicating no measurement gap.

A device for configuring a measurement gap provided by embodiments of the present disclosure is applied to a network device, and the device includes a memory storing processor-executable instructions; and a processor configured to execute the stored processor-executable instructions to perform an operation of: sending first configuration information to a terminal, the first configuration information being used for determining a measurement gap corresponding to capability information of the terminal, where the capability information of the terminal is used for indicating at least one of whether the terminal supports capability of performing independent gap measurement within different frequency ranges or whether the terminal supports capability of no measurement gap, and the first configuration information includes first indication information used for indicating no measurement gap.

BRIEF DESCRIPTION OF THE DRAWINGS

The drawings described herein are used to provide a further understanding of the application and form a part of the application. The schematic embodiments of the application and the description thereof are used to explain the application and do not constitute an improper limitation of the application. In the drawings:

FIG. 3 is a flowchart of a method for configuring a measurement gap according to an embodiment of the present disclosure;

DETAILED DESCRIPTION

The technical solution in the embodiments of the application will be described below in conjunction with the drawings in the embodiments of the application. It is apparent that the described embodiments are a part of the embodiments of the application, not all of the embodiments. Based on the embodiments in the application, all other embodiments obtained by those skilled in the art without creative effort belong to the protection scope of the application.

The technical solutions of the embodiments of the present disclosure can be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD), a Universal Mobile Telecommunication System (UMTS), a Worldwide Interoperability for Microwave Access (WiMAX) communication system, or a 5G system.

Figure 1:
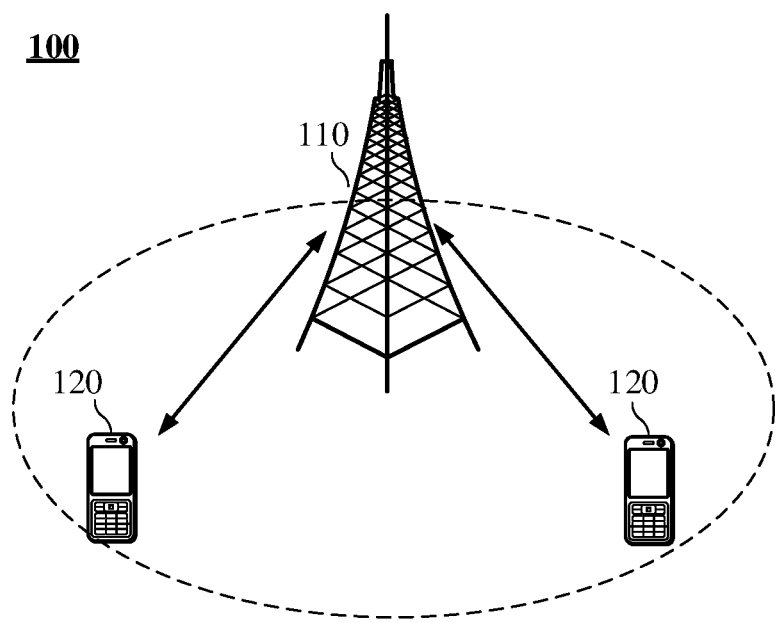
FIG. 1 is a schematic diagram of a communication system architecture according to an embodiment of the present disclosure.

Exemplarily, the communication system 100 to which the embodiments of the present disclosure is applied is illustrated in FIG. 1. The communication system 100 may include a network device 110, which may be a device communicating with a terminal 120 (also referred to as a communication terminal or terminal). The network device 110 may provide communication coverage for a specific geographic area and may communicate with a terminal located within the coverage area. Optionally, the network device 110 may be a Base Transceiver Station (BTS) in a GSM system or a CDMA system, or may be a NodeB (NB) in a WCDMA system, or may also be an Evolutional Node B (eNB or eNodeB) in an LTE system, or may be a radio controller in a Cloud Radio Access Network (CRAN), or the network device can be a mobile switching center, relay station, access point, on-board equipment, wearable equipment, hub, switch, bridge, router, network-side device in the 5G network, a network device in a Public Land Mobile Network (PLMN), or the like.

The communication system 100 also includes at least one terminal 120 located within the coverage of the network device 110. The "terminal" used herein includes but is not limited to a device connected via wired lines, such as public switched telephone networks (PSTN), digital subscriber line (DSL), digital cable, direct cable connection; and/or via another data connection/network; and/or via wireless interface, for example cellular network, wireless local area network (WLAN), Digital television network such as DVB-H network, satellite network, AM-FM broadcast transmitter; and/or a device of another terminal, which is configured to receive/send communication signals; and/or Internet of things (IOT) device. A terminal configured to communicate via a wireless interface may be referred to as a "wireless communication terminal", "wireless terminal" or "mobile terminal". Examples of mobile terminals include, but are not limited to, satellite phones or cellular phones; personal communications system (PCS) terminals that can combine cellular radiotelephony with capabilities such as data processing, fax and data communication; PDAs that may include radiophones, pagers, Internet/intranet access, web browsers, notebooks, calendars, and/or global positioning system (GPS) receivers; and conventional laptop and/or handheld receivers or other electronic devices including radiophone transceivers. The terminal can refer to an access terminal, user equipment (UE), user unit, user station, mobile station, remote station, remote terminal, mobile device, user terminal, terminal, wireless communication device, user agent or user device. Access terminals can be cellular telephone, cordless telephone, session initiation protocol (SIP) telephone, wireless local loop (WLL) station, personal digital processing (PDA), handheld device with wireless communication function, computing device or other processing device connected to wireless modem, on-board device, wearable device, terminal in 5G network or terminal in future evolving PLMN, or the like.

Optionally, the terminal 120 may perform Device-to-Device (D2D) communication.

Optionally, a 5G communication system or 5G network may also be referred to as a New Radio (NR) system or NR system.

FIG. 1 illustrates one network device and two terminal devices. Optionally, the communication system 100 may include a plurality of network devices and another number of terminal devices may be included within the coverage of each network device, which is not limited in the embodiments of the present disclosure.

Optionally, the communication system 100 may further include other network entities such as a network controller, a mobility management entity and the like, which are not limited in the embodiments of the present disclosure.

It should be understood that a device having a communication function in a network/system in embodiments of the present disclosure may be referred to as a communication device. Taking the communication system 100 shown in FIG. 1 as an example, the communication device may include a network device 110 and a terminal device 120 having a communication function, and the network device 110 and the terminal device 120 may be specific devices described above, and details are not described herein. The communication device may also include other devices in the communication system 100, such as network controllers, mobility management entities, and other network entities, which are not limited in the embodiments of the present disclosure.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B, and independent existence of B. In addition, character "/" in the disclosure usually represents that previous and next associated objects form an "or" relationship.

To facilitate understanding of the technical solutions of the embodiments of the present disclosure, the related art of the embodiments of the present disclosure is described below.

1) Radio Link Monitoring (RLM) procedure in NR system.

UE performs downlink radio link monitoring on a primary secondary cell (PSCell) in a Dual Connectivity (DC) state or Primary Cell (PCell) in order to report an out-of-sync/in-sync status indication to the higher layer. In general, the UE only needs to perform radio link quality monitoring on an active Down Link (DL) Bandwidth Part (BWP) of the PSCell in the DC state or the PCell. Alternatively, the UE only needs to perform radio link quality monitoring on the active DL BWP of a Special Cell (SpCell).

For each DL BWP of one SpCell, the UE will be configured with a set of resource indications for determining RadioLinkMonitoring-Reference Signal (RLM-RS), which are used for determining an RLM-RS and for performing RLM according to the RLM-RS. The RLM-RS may be a Channel Status Indicator Reference Signal (CSI-RS) or a SS/PBCH block (SSB). The UE may be configured with at most a number NLR-RLM of RLM-RSs for a link recovery procedure and radio link monitoring. Among the number NLR-RLM of RLM-RSs, at most a number NRLM of RLM-RSs can be used for radio link monitoring and at most 2 RLM-RSs can be used for link recovery procedures. The value of NRLM is related to the maximum number Lmax of SSBs included in a half frame.

2) Measurement gap (MG).

The UE of the NR may support E-UTRA-NR Dual Connectivity (EN-DC), NR-E-UTRA Dual Connectivity (NE-DC), NR-DC, etc., and a per UE gap or a per FR gap may be configured.

Only one Per UE gap, i.e., gapUE, can be configured, which is for measurement for the frequencies of FR1 and FR2. For the per UE gap, the Master Node (MN) determines the configuration information (i.e., gapUE) for the gap.

Two independently per FR gaps, i.e. gapFR1 and/or gapFR2 can be configured, where the gapFR1 is used for the measurement for the frequency of FR1, and the gapFR2 for the measurement for the frequency of the FR2. For the per FR gap, the MN determines the configuration information for the gapFR1, and the SN determines the configuration information for the gapFR2.

The UE with Evolved Universal Terrestrial Radio Access (E-UTRA) only adopts the measurement gap configuration of LTE, that is, per UE gap.

For example, during the negotiation of the gap configuration, details are as follows.

For the per UE gap, an MN indicates the configuration information and the gap purpose of the per UE gap to s Secondary Node (SN). The SN indicates, to the MN, a list of frequencies to be measured by the SN on the FR1 or/and the FR2.

For the per FR gap, the SN indicates, to the MN, a list of frequencies to be measured by the SN on the FR1, and the MN indicates, to the SN, a list of frequencies to be measured by the MN on the FR2.

Figure 2:
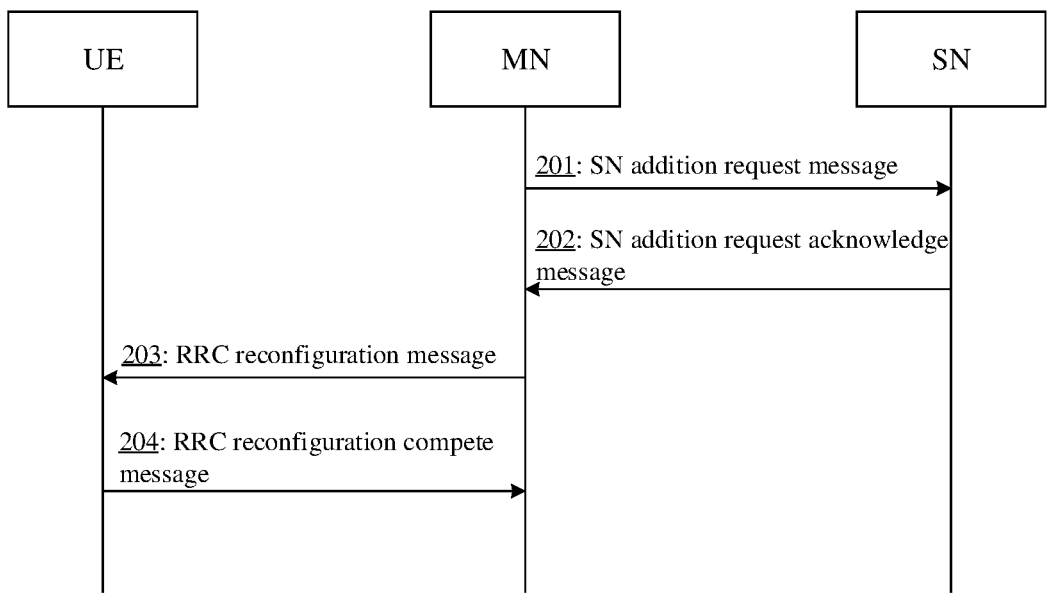
FIG. 2 is a flowchart of adding an SN node according to an embodiment of the present disclosure.

FIG. 2 is a flowchart of adding an SN node, and the configuration of the measurement gap may be implemented by the flowchart. As shown in FIG. 2, the flow includes the following operations 201 to 204.

In operation 201, an MN sends an SN addition request message to the SN.

In the SN addition request message, the MN indicates the UE capability information reported by the UE and previously obtained by the MN to the SN. The UE capability information includes independentGapConfig, that is, the capability regarding whether the UE supports per FR gap (which can also be understood as whether or not the UE supports independent radio frequency capabilities to satisfy independent measurements of the gapFR1 and the gapFR2), and the MN indicates, to the SN, the configuration information for the per UE gap or the per FR gap and gap purpose.

Before the operation 201, the MN may have obtained the measurement report reported by the UE, and the MN determines whether to add an SN according to the measurement report. In a case where the MN determines to add the SN, the MN sends an SN addition request message to the SN.

In operation 202, the SN sends an SN add request acknowledgement message to the MN.

Herein, the SN addition request acknowledgement message carries a radio resource control (RRC) configuration message of the SN side. If the SN is configured with the per UE gap, the SN indicates, to the MN, the list of frequencies to be measured on FR1 or FR2; and if the SN is configured with per FR gap, the SN will not indicate additional gap configuration assistance information, such as the frequency list, to the MN.

In operation 203, the MN sends a radio resource control (RRC) reconfiguration message to the UE.

Herein, the RRC reconfiguration message carries the RRC configuration message of the SN side. For the UE, the gap is updated based on the RRC configuration information.

In operation 204, the UE sends an RRC reconfiguration complete message to the MN.

Table 1 below applies to the measurement gap pattern configuration for the EN-DC scenario and Table 2 below applies to the measurement gap pattern configuration for the NR-SA scenario.

TABLE 1

| Measurement gap pattern configuration | Serving cell | Measurement purpose | Applicable Gap Pattern ID |
|---|---|---|---|
| Per-UE measurement gap | E-UTRA + FR1, or E-UTRA + FR2, or | Non-NR RAT Note1, 2 | 0, 1, 2, 3 |
| | E-UTRA + FR1 + FR2 | FR1 and/or FR2 | 0-11 |
| | | Non-NR RAT Note1, 2 and FR1 and/or FR2 | 0, 1, 2, 3, 4, 6, 7, 8, 10 |
| Per FR measurement gap | E-UTRA and, FR1 if configured FR2 if configured | Non-NR RAT Note1, 2 | 0, 1, 2, 3 |
| | E-UTRA and, FR1 if configured FR2 if configured | FR1 only | No gap 0-11 |
| | E-UTRA and, FR1 if configured FR2 if configured | FR2 only | No gap No gap 12-23 |
| | E-UTRA and, FR1 if configured FR2 if configured | Non-NR RAT Note1, 2 and FR1 | 0, 1, 2, 3, 4, 6, 7, 8, 10 No gap |
| | E-UTRA and, FR1 if configured FR2 if configured | FR1 and FR2 | 0-11 12-23 |
| | E-UTRA and, FR1 if configured FR2 if configured | Non-NR RAT Note1, 2 and FR2 | 0, 1, 2, 3, 4, 6, 7, 8, 10 12-23 |
| | E-UTRA and, FR1 if configured FR2 if configured | Non-NR RAT Note1, 2 and FR1 and FR2 | 0, 1, 2, 3, 4, 6, 7, 8, 10 12-23 |

TABLE 2

| Measurement gap pattern configuration | Serving cell | Measurement purpose | Applicable Gap Pattern ID |
|---|---|---|---|
| Per-UE measurement gap | FRE or FR1 + FR2 | E-UTRA only[NOTE3] | 0, 1, 2, 3 |
| | | FR1 and/or FR2 | 0-11 |
| | | E-UTRAN and FR1 and/or FR2 [NOTE3] | 0, 1, 2, 3,4, 6, 7, 8, 10 |
| | FR2 | E-UTRA only [NOTE3] | 0, 1,2, 3 |
| | | FR1 only | 0-11 |
| | | FR1 and FR2 | 0-11 |
| | | E-UTRAN and FR1 and/or FR2 [NOTE3] | 0, 1 ,2, 3,4, 6, 7, 8, 10 |
| | | FR2 only | 12-23 |
| Per FR measurement gap | FR1 if configured FR2 if configured | E-UTRA only [NOTE3] | 0, 1, 2, 3 No gap |
| | FR1 if configured FR2 if configured | FR1 only | 0-11 No gap |
| | FR1 if configured FR2 if configured | FR2 only | No gap 12-23 |
| | FR1 if configured FR2 if configured | E-UTRA and FR1 [NOTE3] | 0, 1, 2, 3,4, 6, 7, 8, 10 No gap |
| | FR1 if configured FR2 if configured | FR1 and FR2 | 0-11 12-23 |
| | FR1 if configured FR2 if configured | E-UTRA and FR2 [NOTE3] | 0, 1, 2, 3, 4, 6, 7, 8, 10 12-23 |
| | FR1 if configured FR2 if configured | E-UTRA and FR1 and FR2 [NOTE3] | 0, 1, 2, 3,4, 6, 7, 8, 10 12-23 |

The per-UE gap and per FR gap in Tables 1 and 2 are configured through MeasgapConfig whose information elements are shown in Table 3 below. In the MeasgapConfig, gapFR1 is used for indicating the measurement gap configuration for FR1. In the EN-DC scenario, gapFR1 cannot be configured using NR RRC, only LTE RRC can configure gapFR1). The gapFR2 is used for indicating the measurement gap configuration for FR2. The gapUE is used for indicating the measurement gap configuration for all frequencies, including FR1 and FR2. In the EN-DC scenario, the gapUE cannot be configured using NR RRC, only LTE RRC can configure gapUE).

TABLE 3

```
MeasgapConfig ::= SEQUENCE {
  GapFR2 SetupRelease {gapConfig} OPTIONAL, -- Need M
  ...,
  [[
  GapFR1 SetupRelease {gapConfig} OPTIONAL, -- Need M
  GapUE SetupRelease {gapConfig} OPTIONAL -- Need M
  ]]
}
GapConfig ::= SEQUENCE {
  GapOffset INTEGER (0..159) ,
  Mgl ENUMERATED {ms1dot5, ms3, ms3dot5, ms4, ms5dot5, ms6},
  Mgrp ENUMERATED {ms20, ms40, ms80, ms160},
  Mgta ENUMERATED {ms0, ms0dot25, ms0dot5},
  ...
}
```

It is to be noted that gapUE and gapFR1/gapFR2 cannot be configured at the same time. For UEs that support EN-DC, gapUE and gapFR1 can only be configured by E-UTRA.

On the other hand, UE capability is defined, that is, whether the UE supports the capability of per FR gap (that is, whether the UE supports capability of performing independent gap measurement within different frequency ranges), and the UE capability is configured through independentGapConfig; and whether the UE supports the capability of performing independent gap measurement within different frequency ranges refers to whether the UE supports two independent measurement gap (gapFR1, gapFR2) configurations.

For a case where the UE supports the per FR gap capability and the network provides the per FR gap configuration, the no gap may be supported. For example, if the serving cell is FR2 and the Measurement purpose is FR1 or E-UTRA, the no gap may be configured as shown in Table 1 and Table 2. For a case where the network provides the per UE gap configuration, the UE does not support the configuration of no gap, as shown in Table 1 and Table 2.

It can be seen that the UE can configure the no gap under specific conditions, but the scenario where the UE configures the no gap is limited. In the embodiments of the present disclosure, the measurement gap for UE can be configured in combination with whether the UE supports the capability of performing independent gap measurement within different frequency ranges, and no gap assisted measurement can be supported.

FIG. 3 is a flowchart of a method for configuring a measurement gap according to an embodiment of the present disclosure. As shown in FIG. 3, the method for configuring a measurement gap includes an operation 301.

In operation 301, a network device sends first configuration information to a terminal, and the terminal receives the first configuration information from the network device, the first configuration information being used for determining a measurement gap corresponding to capability information of the terminal, where the capability information of the terminal is used for indicating whether the terminal supports capability of performing independent gap measurement within different frequency ranges.

In the embodiments of the present disclosure, the network device may be a base station, such as a 4G base station (i.e., eNB), and an NR base station (i.e., gNB).

In the embodiments of the present disclosure, the terminal may be any device capable of communicating with a network, such as a mobile phone, a tablet computer, a notebook, an in-vehicle terminal, or a wearable device.

In the embodiments of the present disclosure, the network device sends the first configuration information to the terminal, and the terminal receives the first configuration information from the network device, which may be implemented in the following manner.

The network device sends an RRC reconfiguration message to the terminal, and the terminal receives an RRC reconfiguration message from a serving cell, the RRC reconfiguration message being used for indicating the first configuration information.

In an application scenario, the RRC reconfiguration message is an RRC reconfiguration message in a secondary node addition procedure.

Specifically, referring to FIG. 2 that is a flowchart of SN node addition, in the operation 203 according to the embodiments of the present disclosure, the first configuration information may be carried in the RRC reconfiguration message sent from the MN to the UE. It is to be noted that the UE in FIG. 2 corresponds to the terminal in the embodiments of the present disclosure.

In another application scenario, the RRC reconfiguration message is an RRC reconfiguration message in a cell handover procedure.

Specifically, the cell handover procedure includes the following operations 1) to 4). 1) A terminal sends a measurement report to a serving cell. 2) The serving cell determines a target cell to be handed over based on the measurement report, and sends a handover request message to the target cell. 3) The target cell sends a handover request acknowledgement message to the serving cell, where the handover request acknowledgement message carries a configuration message of the target cell side. 4) The serving cell sends a handover command, that is, an RRC reconfiguration message, to the terminal. According to the embodiments of the present disclosure, the first configuration information can be carried in the RRC reconfiguration message.

In the embodiments of the present disclosure, the capability information of the terminal is configured through the independentGapConfig. If the value of independentGapConfig is 1, it represents that the terminal supports capability of performing independent gap measurement within different frequency ranges, that is, the terminal is capable of independent measurement gap patterns, or the terminal supports patterns of FR1 gap and FR2 gap; and if the value of independentGapConfig is 0, it represents that the terminal does not support the capability of performing independent gap measurement within different frequency ranges. Herein, the terminal supports the capability of performing independent gap measurement within different frequency ranges, for example, the terminal supports the capability of performing independent gap measurement within the FR1 and/or the FR2.

It is to be noted that the independentGapConfig is reported by the terminal to the network device, and the network device generates the first configuration information based on the independentGapConfig from the terminal.

In the embodiments of the present disclosure, in a case where the terminal supports capability of performing independent gap measurement within different frequency ranges, the first configuration information includes first indication information used for indicating no measurement gap.

For example, the value of independentGapConfig is 1 (i.e., the terminal supports capability of performing independent gap measurement within different frequency ranges), and the first configuration information includes an applicable gap pattern ID for indicating no gap. In this way, in the case where the terminal supports the capability of independentgap, the network device may configure the terminal with the no gap, and the terminal may perform no gap assisted measurement.

Furthermore, the first configuration information is used for indicating a serving cell corresponding to the first indication information and/or an object to be measured corresponding to the first indication information, where the object to be measured corresponding to the first indication information may be represented by a first measurement purpose.

In the above solutions, except that the terminal supports capability of performing independent gap measurement within different frequency ranges, the conditions for which the network device configures no gap for the terminal also need to include a specific serving cell and a specific first measurement purpose. The following describes several scenarios supporting the configuration of the no gap in combination with the serving cell and the first measurement purpose. It is to be noted that a prerequisite of the scenarios 1 to 5 is that the terminal supports capability of performing independent gap measurement within different frequency ranges.

In scenario 1, the terminal supports a first dual connectivity mode where radio access technologies of a master node and a secondary node are a first radio access technology and a second radio access technology, respectively; and a serving cell of the terminal is a cell with the first radio access technology, and the object to be measured is a cell within a first frequency range.

Herein, the first dual connectivity mode refers to EN-DC, the first radio access technology refers to Evolved Universal Terrestrial Radio Access (E-UTRA), and the second radio access technology refers to NR Radio Access (NR). Specifically, in the EN-DC, the master node is an LTE base station, and the secondary node is an NR base station.

Herein, the serving cell of the terminal is an E-UTRA cell, and the first measurement purpose is a cell within the FR2. Measurement in this scenario belongs to an inter-RAT (radio access technology) measurement.

It is to be noted that the FR1 and the FR2 in the embodiment of the present disclosure refer to the NR FR1 and the NR FR2. The frequency range NR FR1 generally refers to the 5G Sub-6 GHz (6 GHz or less) band and may be extended to sub-7 GHz (7 GHz or less) in the future, and the frequency range NR FR2 generally refers to the 5G millimeter wave band.

In scenario 2, the terminal supports a second dual connectivity mode where radio access technologies of a master node and a secondary node are a second radio access technology and a first radio access technology, respectively; and a serving cell of the terminal is at least one of a cell with the first radio access technology or a cell within a second frequency range, and the object to be measured is a cell within a first frequency range.

Herein, the second dual connectivity mode refers to the NE-DC, the second radio access technology refers to the NR, and the first radio access technology refers to the E-UTRA. Specifically, in the NE-DC, the master node is an NR base station, and the secondary node is an LTE base station.

Herein, the serving cell of the terminal is an E-UTRA cell and/or a cell within FR1, and the first measurement purpose is a cell within FR2. The measurement in this scenario belongs to the inter-RAT measurement.

It is to be noted that the FR1 and the FR2 in the embodiment of the present disclosure refer to the NR FR1 and the NR FR2.

In scenario 3, the terminal supports a second dual connectivity mode where radio access technologies of a master node and a secondary node are a second radio access technology and a first radio access technology, respectively; and a serving cell of the terminal is a cell within a first frequency range, and the object to be measured is at least one of a cell with a first radio access technology or a cell within a second frequency range.

Herein, the second dual connectivity mode refers to the NE-DC, the second radio access technology refers to the NR, and the first radio access technology refers to the E-UTRA. Specifically, in the NE-DC, the master node is an NR base station, and the secondary node is an LTE base station.

Herein, the serving cell of the terminal is a cell within the FR2, and the first measurement purpose is an E-UTRA cell and/or a cell within the FR1. In this scenario, if the NE-DC is to be established, the measurement for the E-UTRA belongs to the inter-RAT measurement; and if NR-DC or NR CA is to be established, the measurement for FR1 belongs to an inter-frequency measurement.

It is to be noted that the FR1 and the FR2 in the embodiment of the present disclosure refer to the NR FR1 and the NR FR2.

In scenario 4, the terminal supports a stand alone mode, a serving cell of the terminal is a cell with a first radio access technology, and the object to be measured is a cell within a first frequency range.

Herein, the stand alone mode may be, but is not limited to, an NR SA, and the stand alone mode may also be LTE only.

Herein, the serving cell of the terminal is an E-UTRA cell, and the first measurement purpose is a cell within the FR2.

It is to be noted that the FR1 and the FR2 in the embodiment of the present disclosure refer to the NR FR1 and the NR FR2.

In scenario 5, the terminal supports a stand alone mode, a serving cell of the terminal is a cell within a first frequency range, and the object to be measured is at least one of a cell with a first radio access technology or a cell of within second frequency range.

Herein, the stand alone mode may be, but is not limited to, an NR SA, and the stand alone mode may also be LTE only.

Herein, the serving cell of the terminal is a cell within the FR2, and the first measurement purpose is an E-UTRA cell and/or a cell within the FRE It is to be noted that the FR1 and the FR2 in the embodiment of the present disclosure refer to the NR FR1 and the NR FR2.

The terminal in each of the above scenarios 1 to 5 supports the configuration of no gap under the condition that the terminal supports capability of performing independent gap measurement within different frequency ranges.

Other scenarios are not excluded, such as a measurement scenario of UE already in Non Stand Alone (NSA) (EN-DC or NE-DC) dual connectivity state, for example a serving cell of EN-DC/NE-DC UE is a cell within the FR1 and an E-UTRA cell, the measurement purpose is a cell within the FR2 (it is to be noted that such a scenario is compatible with the prior art).

According to the embodiments of the present disclosure, the measurement configuration of the terminal is optimized. For a terminal that supports capability of performing independent gap measurement within different frequency ranges, the no gap configuration in certain measurement scenarios can be implemented in the per-UE gap configuration, which improves the efficiency of system measurement and saves measurement overhead.

The technical solutions of the embodiments of the present disclosure are illustrated below in connection with specific application examples below.

FIRST APPLICATION EXAMPLE

The MG requirement of the NR UE is modified, and the MG patterns are distinguished by the UE capability. It is to be noted that the FR1 and the FR2 in the following embodiments may refer to the NR FR1 and the NR FR2. Specifically, the following modifications (for cases 1 to 3) are made to MG requirement.

In case 1, for NSA EN-DC UE, in a scenario where the UE is not configured with EN-DC or the serving cell of the UE still has only an E-UTRAN, the network side may configure the measurement gap pattern configuration according to the independentgapConfig.

Specifically, the serving cell is an E-UTRA cell, and the UE supports independentgap (i.e., the value of independentGapconfig is 1, representing supported independentgap).

1) Measurement Purpose is FR2, then no gap (i.e., scenario 1 described above in the present disclosure) can be configured regardless of whether the measurement gap configuration of the UE sent from the network side is Per-UE (gapUE configured by MN LTE) or Per-FR2 (gapFR2 configured by SN NR).

2) Measurement Purpose is E-UTRA/FR1+FR2, or E-UTRA+FR1, or E-UTRA+FR1+FR2. If the MN configures MG of gapUE, then a uniform gap is adopted for the FR1 and the FR2, and no gap cannot be configured. If gap of per FR is configured, that is, gapFR1 is configured for the MN and gapFR2 is configured for the SN, no gap may be configured for the measurement for FR2.

In case 2, for NSA NE-DC UE, in the scenario where the UE is not configured with NE-DC or the serving cell of the UE is still only configured with E-UTRAN or NR, the network side may configure measurement gap pattern configuration according to independentgapConfig.

1) The UE supports independentgap (that is, the value of independentGapconfig is 1, representing supported independentgap), the serving cell is an E-UTRA cell, and Measurement Purpose is FR2. Regardless of whether the measurement gap configuration of the UE issued from the network side at this time is Per-UE (gapUE configured by MN NR) or Per-FR2 (gapFR2 configured by SN LTE), the no gap can be configured (that is, scenario 2 described above in the present disclosure).

2) The UE supports independentgap (that is, the value of independentGapconfig is 1, representing supported independentgap), the serving cell is a FR2 cell, and Measurement Purpose is E-UTRA/FR1. Regardless of whether the measurement gap configuration of the UE issued from the network side is Per-UE (gapUE configured by MN NR) or Per-FR2 (gapFR2 configured by SN LTE), no gap (that is, the scenario 3 described above in this application) can be configured.

In case 3, for NR SA UE, the network side may configure measurement gap pattern configuration according to independentgapConfig.

1) The UE supports independentgap (that is, the value of independentGapconfig is 1, representing supported independentgap), the serving cell is an E-UTRA cell, and Measurement Purpose is FR2. Regardless of whether the measurement gap configuration of the UE issued from the network side is Per-UE or Per-FR, no gap can be configured (that is, the scenario 4 described above in the present disclosure).

2) The UE supports independentgap (that is, the value of independentGapconfig is 1, representing supported independentgap), the serving cell is FR2, and Measurement Purpose is E-UTRA/FR1 or E-UTRA+FR1. At this time, regardless of whether the measurement gap configuration of the UE issued from the network side is Per-UE or Per-FR, no gap can be configured (that is, the scenario 5 described above in the present disclosure).

The above optimization schemes will apply to all mobility management procedures involving inter-RAT (between E-UTRA and NR) measurement, NR inter-frequency (between FR1 and FR2) measurement.

Furthermore, the following describes how the network side configures the measurement gap by taking the SN node addition procedure as an example.

In operation 201, in the SN addition request message, the MN indicates the UE capability information reported by the UE and previously obtained by the MN to the SN. The UE capability information includes independentGapConfig, that is, the capability regarding whether the UE supports per FR gap (which can also be understood as whether or not the UE supports independent radio frequency capabilities to satisfy independent measurements of the gapFR1 and the gapFR2), and the MN indicates, to the SN, the configuration information for the per UE gap or the per FR gap and gap purpose. Before the operation 201, the MN may have obtained the measurement report reported by the UE, and the MN determines whether to add an SN according to the measurement report. In a case where the MN determines to add the SN, the MN sends an SN addition request message to the SN.

In operation 202, if the SN is configured with per UE gap, the SN indicates, to the MN, a list of frequencies to be measured on FR1 or FR2; and if the SN is configured with per FR gap, the SN will not indicate additional gap configuration assistance information, such as the frequency list, to the MN.

In operation 203, for the UE, the MN will issue a new MG pattern to the UE, and the UE updates the MG pattern. It is to be noted that 1) if the UE supports independentgap, the UE has not been configured with EN-DC or the serving cell of the UE is still connected to only the E-UTRAN cell, then the measurement for FR2 does not need to be configured with a gap, i.e., no gap. 2) The UE is configured with EN-DC and is in the DC state, and the node within FR2 in the frequency list reported by SN to the MN may optionally not be configured with the measurement gap, that is, no gap. 3) If the UE is in an NR SA mode, the inter-RAT NR Measurement does not need to be configured with the gap, i.e., no gap.

SECOND APPLICATION EXAMPLE

The Per-UE or Per-FR measurement of MeasgapConfig is further distinguished in combination with the condition of the UE capability to define Applicable gap pattern IDs for different serving cells and measurement purposes.

For NSA UE, Applicable gap pattern ID configuration is shown in Table 4 below. For NR SA UE, Applicable gap pattern ID configuration is shown in Table 5 below.

TABLE 4

| Measurement gap pattern configuration | Serving cell | Measurement purpose | Applicable Gap Pattern ID | UE capability |
|---|---|---|---|---|
| Per-UE measurement gap | FR1, or FR1 + FR2 | E-UTRA only<sup>NOTE3</sup> | 0, 1, 2, 3 | (IndependentGapconfig = 0, not supported) Note: Not capable of independent measurement gap patterns |
| | | FR1 and/or FR2 | 0-11 | (IndependentGapconfig = 0, not supported) Note: Not capable of independent measurement gap patterns |
| | | E-UTRAN and FR1 and/or FR2 <sup>NOTE3</sup> | 0, 1, 2, 3, 4, 6, 7, 8, 10 | |
| | FR2 | E-UTRA only <sup>NOTE3</sup> | 0, 1, 2, 3 | |
| | | FR1 only | 0-11 | |
| | | FR1 and FR2 | 0-11 | |
| | | E-UTRAN and FR1 and/or FR2 <sup>NOTE3</sup> | 0, 1, 2, 3, 4, 6, 7, 8, 10 | |
| | | FR2 only | 12-23 | |
| | FR2 | E-UTRA only <sup>NOTE3</sup> | No gap | (IndependentGapconfig = 1, supported) Note: Capable of independent measurement gap patterns |
| | FR2 | E-UTRA and FR1 <sup>NOTE3</sup> | No gap | |
| | FR2 | FR1 only | No gap | |
| | FR1 | FR2 only | No gap | |
| Per FR measurement gap | FR1 if configured | E-UTRA only <sup>NOTE3</sup> | 0, 1, 2, 3 | (IndependentGapconfig = 0, not supported) |
| | FR2 if configured | | No gap | (IndependentGapconfig = 1, supported) |
| | FR1 if configured | FR1 only | 0-11 | (IndependentGapconfig = 0, not supported) |
| | FR2 if configured | | No gap | (IndependentGapconfig = 1, supported) |
| | FR1 if configured | FR2 only | No gap | (IndependentGapconfig = 1, supported) |
| | FR2 if configured | | 12-23 | (IndependentGapconfig = 0, not supported) |
| | FR1 if configured | E-UTRA and FR1 <sup>NOTE3</sup> | 0, 1, 2, 3, 4, 6, 7, 8, 10 | (IndependentGapconfig = 0, not supported) |
| | FR2 if configured | | No gap | (IndependentGapconfig = 1, supported) |
| | FR1 if configured | FR1 and FR2 | 0-11 | (IndependentGapconfig = 0, not supported) |
| | FR2 if configured | | 12-23 | (IndependentGapconfig = 0, not supported) |
| | FR1 if configured | E-UTRA and FR2 <sup>NOTE3</sup> | 0, 1, 2, 3, 4, 6, 7, 8, 10 | (IndependentGapconfig = 0, not supported) |
| | FR2 if configured | | 12-23 | (IndependentGapconfig = 0, not supported) |
| | FR1 if configured | E-UTRA and FR1 and FR2 <sup>NOTE3</sup> | 0, 1, 2, 3, 4, 6, 7, 8, 10 | (IndependentGapconfig = 0, not supported) |
| | FR2 if configured | | 12-23 | (IndependentGapconfig = 0, not supported) |

TABLE 5

| Measurement gap pattern configuration | Serving cell | Measurement purpose | Applicable Gap Pattern ID | UE capability |
|---|---|---|---|---|
| Per-UE measurement gap | FR1 or FR1 + FR2 | E-UTRA only<sup>NOTE3</sup> | 0, 1, 2, 3 | (IndependentGapconfig = 0, not supported) |
| | | FR1 and/or FR2 | 0-11 | (IndependentGapconfig = 0, not supported) |
| | | E-UTRAN and FR1 and/or FR2 <sup>NOTE3</sup> | 0, 1, 2, 3, 4, 6, 7, 8, 10 | (IndependentGapconfig = 0, not supported) |
| | FR2 | E-UTRA only <sup>NOTE3</sup> | 0, 1, 2, 3 | (IndependentGapconfig =0, not supported) |
| | | FR1 only | 0-11 | (IndependentGapconfig =0, not supported) |
| | | FR1 and FR2 | 0-11 | (IndependentGapconfig =0, not supported) |
| | | E-UTRAN and FR1 and/or FR2 <sup>NOTE3</sup> | 0, 1, 2, 3, 4, 6, 7, 8, 10 | (IndependentGapconfig = 0, not supported) |

TABLE 5-continued

| Measurement gap pattern configuration | Serving cell | Measurement purpose | Applicable Gap Pattern ID | UE capability |
|---|---|---|---|---|
| | | FR2 only | 12-23 | (IndependentGapconfig = 0, not supported) |
| | FR1 FR2 | FR2 only FR1 and/or E-UTRA | No gap | (IndependentGapconfig = 1, supported) |
| Per FR measurement gap | E-UTRA FR1 if configured | FR2 only E-UTRA only NOTE3 | 0, 1, 2, 3 | (IndependentGapconfig = 0, not supported) |
| | FR2 if configured | | No gap | (IndependentGapconfig = 1, supported) |
| | FR1 if configured | FR1 only | 0-11 | (IndependentGapconfig = 0, not supported) |
| | FR2 if configured | | No gap | (IndependentGapconfig = 1, supported) |
| | FR1 if configured | FR2 only | No gap | (IndependentGapconfig = 1, supported) |
| | FR2 if configured | | 12-23 | (IndependentGapconfig = 0, not supported) |
| | FR1 if configured | E-UTRA and FR1 NOTE3 | 0, 1, 2, 3, 4, 6, 7, 8, 10 | (IndependentGapconfig = 0, not supported) |
| | FR2 if configured | | No gap | |
| | FR1 if configured | FR1 and FR2 | 0-11 | (IndependentGapconfig = 0, not supported) |
| | FR2 if configured | | 12-23 | (IndependentGapconfig = 0, not supported) |
| | FR1 if configured | E-UTRA and FR2 NOTE3 | 0, 1, 2, 3, 4, 6, 7, 8, 10 | (IndependentGapconfig = 0, not supported) |
| | FR2 if configured | | 12-23 | (IndependentGapconfig = 0, not supported) |
| | FR1 if configured | E-UTRA and FR1 and FR2 NOTE3 | 0, 1, 2, 3, 4, 6, 7, 8, 10 | (IndependentGapconfig = 0, not supported) |
| | FR2 if configured | | 12-23 | (IndependentGapconfig = 0, not supported) |

The above schemes will apply to all mobility management procedures involving the inter-RAT (between E-UTRA and NR) measurement and the NR inter-frequency (between FR1 and FR2) measurement.

THIRD APPLICATION EXAMPLE

New UE capability, which may be 1-bit information, is introduced into a new protocol version, the UE reports the new UE capability to a network, and the network indicates whether the UE needs the gap according to a version (Rel-15/Rel-16) supported currently by the base station. If the base station supports Rel-16, the new UE capability will be adopted and no gap will be configured; and if the base station does not support Rel-16, the existing method is still adopted to configure the gap.

It is to be noted that the new UE capability described above are applicable to both NR SA UE and DC UE. The measurement behaviors of the existing UE and the enhanced UE will be distinguished by the new UE capability and will be reported to the network, so that the allocation of the gap pattern is more reasonable, and the opportunity of no gap measurement in certain scenarios is improved.

The above schemes will apply to all mobility management procedures involving cross-band inter-RAT (between E-UTRA and NR) measurement and inter-frequency (between FR1 and FR2) measurement.

The following still takes "SN addition" as an example, see the example in the previous section.

Furthermore, the following describes how the network side configures the measurement gap by taking the SN node addition procedure as an example.

In operation 201, in the SN addition request message, the MN indicates the new UE capability information reported by the UE and previously obtained by the MN to the SN. Meanwhile, the MN indicates, to the SN, the configuration information for the per UE gap or the per FR gap and gap purpose.

1) If the UE has not been configured with the EN-DC or the serving cell of the UE is still connected to only the E-UTRAN cell, then the measurement for FR2 does not need to be configured with a gap, that is, the value of the new UE capability information is 1. 2) If the UE is configured with the EN-DC and is in the DC state, then the node within FR2 in the frequency list reported by SN to the MN may optionally not be configured with the measurement gap, that is, the value of the new UE capability information is 1. 3) If the UE is in the NR SA mode, then the inter-RAT NR Measurement does not need to be configured with the gap, and the value of the new UE capability information is 1.

It is to be noted that if the value of the new UE capability information is 0, it indicates that the UE does not support the no gap-assisted measurement, and the network configures the gap according to the existing method.

Figure 4:
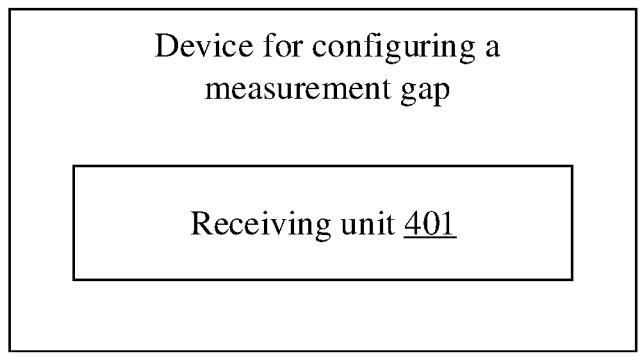
FIG. 4 is a structure diagram I of a device for configuring a measurement gap according to an embodiment of the present disclosure.

FIG. 4 is a first structural diagram of a device for configuring a measurement gap according to an embodiment of the present disclosure. The device for configuring a measurement gap is applied to a terminal. As shown in FIG. 4, the device for configuring a measurement gap includes a receiving unit 401.

The receiving unit 401 is configured to receive first configuration information from a network device, the first configuration information being used for determining a measurement gap corresponding to capability information of the terminal, where the capability information of the terminal is used for indicating whether the terminal supports capability of performing independent gap measurement within different frequency ranges.

In an embodiment, in a case that the terminal supports the capability of performing independent gap measurement within different frequency ranges, the first configuration information includes first indication information used for indicating no measurement gap.

In an embodiment, the first configuration information is used for indicating at least one of a serving cell corresponding to the first indication information or an object to be measured corresponding to the first indication information.

In an embodiment, the terminal supports a first dual connectivity mode where radio access technologies of a master node and a secondary node are a first radio access technology and a second radio access technology, respectively; and a serving cell of the terminal is a cell with the first radio access technology, and the object to be measured is a cell within a first frequency range.

In an embodiment, the terminal supports a second dual connectivity mode where radio access technologies of a master node and a secondary node are a second radio access technology and a first radio access technology, respectively; and a serving cell of the terminal is at least one of a cell with the first radio access technology or a cell within a second frequency range, and the object to be measured is a cell within a first frequency range.

In an embodiment, the terminal supports a second dual connectivity mode where radio access technologies of a master node and a secondary node are a second radio access technology and a first radio access technology, respectively; and a serving cell of the terminal is a cell within a first frequency range, and the object to be measured is at least one of a cell with a first radio access technology or a cell within a second frequency range.

In an embodiment, the terminal supports a stand alone mode, a serving cell of the terminal is a cell with a first radio access technology, and the object to be measured is a cell within a first frequency range.

In an embodiment, the terminal supports a stand alone mode, a serving cell of the terminal is a cell within a first frequency range, and the object to be measured is at least one of a cell with a first radio access technology or a cell of within second frequency range.

In an embodiment, the receiving unit 401 is configured to receive a radio resource control (RRC) reconfiguration message from the serving cell, the RRC reconfiguration message being used for indicating the first configuration information.

In an embodiment, the RRC reconfiguration message is an RRC reconfiguration message in a secondary node addition procedure or an RRC reconfiguration message in a cell handover procedure.

It will be appreciated by those skilled in the art that the relevant description of the above-described device for configuring a measurement gap of the embodiments of the present disclosure may be understood with reference to the relevant description of the method for configuring a measurement gap of the embodiments of the present disclosure.

Figure 5:
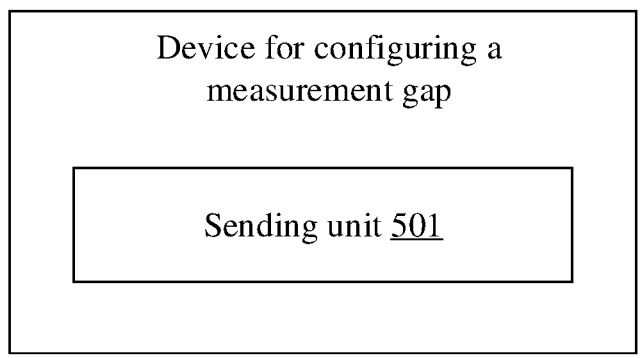
FIG. 5 is a structure diagram II of a device for configuring a measurement gap according to an embodiment of the present disclosure.

FIG. 5 is a second structural diagram of a device for configuring a measurement gap according to an embodiment of the present disclosure. The device for configuring a measurement gap is applied to a terminal. As shown in FIG. 5, the device for configuring a measurement gap includes a sending unit 501.

The sending unit 501 is configured to send first configuration information to a terminal, the first configuration information being used for determining a measurement gap corresponding to capability information of the terminal, where the capability information of the terminal is used for indicating whether the terminal supports capability of performing independent gap measurement within different frequency ranges.

In an embodiment, in a case that the terminal supports the capability of performing independent gap measurement within different frequency ranges, the first configuration information includes first indication information used for indicating no measurement gap.

In an embodiment, the first configuration information is used for indicating at least one of a serving cell corresponding to the first indication information or an object to be measured corresponding to the first indication information.

In an embodiment, the terminal supports a first dual connection mode where radio access technologies of a master node and a secondary node are a first radio access technology and a second radio access technology, respectively; and a serving cell of the terminal is a cell of with the first radio access technology, and the object to be measured is a cell within a first frequency range.

In an embodiment, the terminal supports a second dual connectivity mode where radio access technologies of a master node and a secondary node are a second radio access technology and a first radio access technology, respectively; and a serving cell of the terminal is at least one of a cell with the first radio access technology or a cell within a second frequency range, and the object to be measured is a cell within a first frequency range.

In an embodiment, the terminal supports a second dual connectivity mode where radio access technologies of a master node and a secondary node are a second radio access technology and a first radio access technology, respectively; and a serving cell of the terminal is a cell within a first frequency range, and the object to be measured is at least one of a cell with a first radio access technology or a cell within a second frequency range.

In an embodiment, the terminal supports a stand alone mode, a serving cell of the terminal is a cell with a first radio access technology, and the object to be measured is a cell within a first frequency range.

In an embodiment, the terminal supports a stand alone mode, a serving cell of the terminal is a cell within a first frequency range, and the object to be measured is at least one of a cell with a first radio access technology or a cell of within second frequency range.

In an embodiment, the sending unit 501 is configured to send a radio resource control (RRC) reconfiguration message to the terminal, the RRC reconfiguration message being used for indicating the first configuration information.

In an embodiment, the RRC reconfiguration message is an RRC reconfiguration message in a secondary node addition procedure or an RRC reconfiguration message in a cell handover procedure.

It will be appreciated by those skilled in the art that the relevant description of the above-described device for configuring a measurement gap of the embodiments of the present disclosure may be understood with reference to the relevant description of the method for configuring a measurement gap of the embodiments of the present disclosure.

Figure 6:
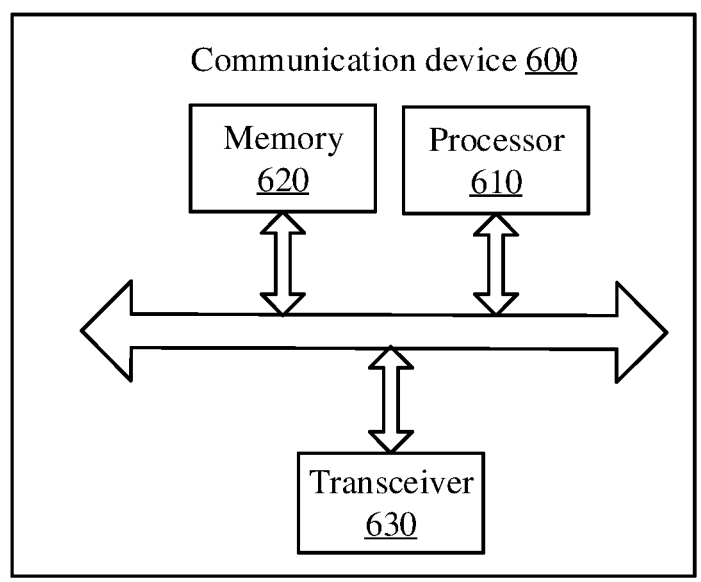
FIG. 6 is a schematic structural diagram of a communication device according to an embodiment of the present disclosure.

FIG. 6 is a schematic structural diagram of a communication device 600 provided in the embodiments of the present disclosure. The communication device can be UE or network device. The communication device 600 illustrated in FIG. 6 includes processor 610, and processor 610 can call and run computer programs from memory to realize the method in the embodiments of the present disclosure.

Optionally, as illustrated in FIG. 6, the communication device 600 may further include a memory 620. The processor 610 can invoke and run the computer program from memory 620 to implement the method in the embodiments of the disclosure.

The memory 620 may be a separate device independent of or integrated into the processor 610.

Optionally, as illustrated in FIG. 6, the communication device 600 may also include a transceiver 630. The processor 610 may control the transceiver 630 to communicate with other devices, in particular, to send information or data to other devices, or receive information or data sent by other devices.

The transceiver 630 may include a transmitter and a receiver. The transceiver 630 may further include an antenna(s), the number of which may be one or more.

Optionally, the communication device 600 can be specifically a network device of the embodiment of the present disclosure, and the communication device 600 can realize the corresponding process realized by the network device in each method of the embodiments of the present disclosure. For the sake of simplicity, it will not be elaborated here.

Optionally, the communication device 600 can be a mobile terminal/UE according to the embodiments of the present disclosure, and the communication device 600 can realize the corresponding flow realized by the mobile terminal/UE in the various methods of the embodiments of the present disclosure. For the sake of brevity, it will not be described here.

Figure 7:
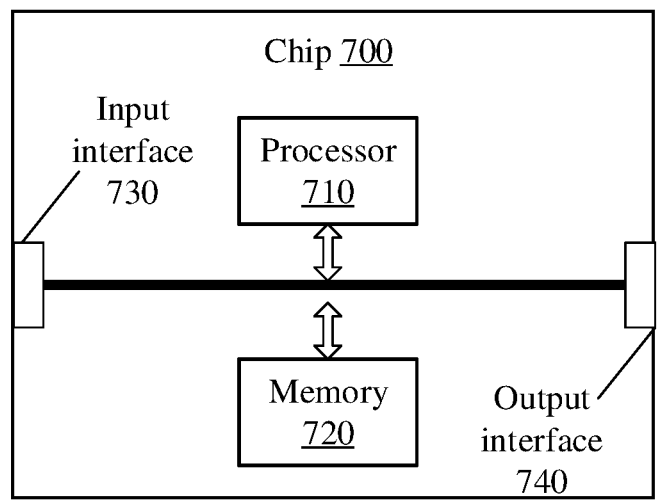
FIG. 7 is a schematic structural diagram of a chip according to an embodiment of the present disclosure.

FIG. 7 is a schematic structural diagram of a chip according to an embodiment of the present disclosure. The chip 700 illustrated in FIG. 7 includes processor 710, and processor 710 can invoke and run computer programs from memory to implement the method in the embodiments of the disclosure.

Optionally, as illustrated in FIG. 7, the chip 700 may also include a memory 720. The processor 710 can invoke and run the computer program from memory 720 to implement the method in the embodiments of the disclosure.

The memory 720 may be a separate device independent of or integrated into the processor 710.

Optionally, the chip 700 may also include an input interface 730. The processor 710 can control the input interface 730 to communicate with other devices or chips, and in particular can obtain information or data sent by other devices or chips.

Optionally, the chip 700 may also include an output interface 740. The processor 710 may control the output interface 740 to communicate with other devices or chips, and in particular may output information or data to other devices or chips.

Optionally, the chip can be applied to the network device in the embodiments of the present disclosure, and the chip can realize the corresponding process realized by the network device in each method of the embodiments of the disclosure. For the sake of brevity, it will not be elaborated here.

Optionally, the chip can be applied to the mobile terminal/UE in the embodiments of the present disclosure, and the chip can realize the corresponding flow realized by the mobile terminal/UE in each method of the embodiment of the disclosure. For the sake of simplicity, it will not be described here.

It is to be understood that the chips mentioned in the embodiments of the present disclosure can also be referred to as system level chips, system chips, chip systems or on-chip system chips, etc.

Figure 8:
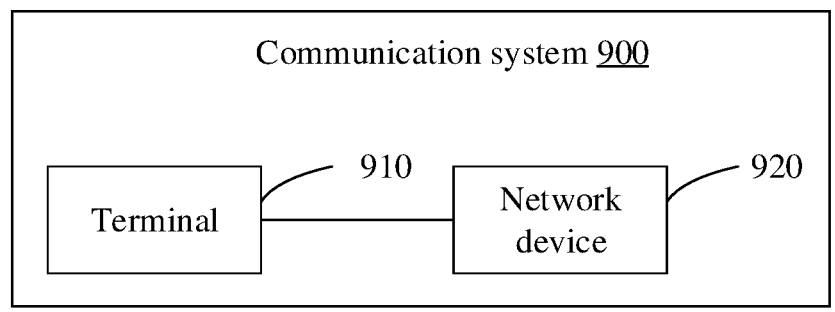
FIG. 8 is a schematic block diagram of a communication system according to an embodiment of the present disclosure.

FIG. 8 is a schematic block diagram of a communication system 900 provided by an embodiment of the present disclosure. As illustrated in FIG. 8, the communication system 900 includes a terminal 910 and a network device 920.

The terminal 910 can be used to realize the corresponding functions realized by the terminal in the above method, and the network device 920 can be used to realize the corresponding functions realized by the network device in the above method. For the sake of simplicity, it will not be elaborated here.

It is to be understood that the processor of the embodiment of the present disclosure may be an integrated circuit chip with signal processing capability. In the implementation process, each step of the above method embodiment can be completed by the instruction in the form of integrated logic circuit of hardware or software in the processor. The above processors can be general purpose processors, digital signal processors (DSPS), application specific integrated circuits (ASICs), field programmable gate arrays (FPGAs) or other programmable logic devices, discrete gate or transistor logic devices, and discrete hardware components. The disclosed methods, steps and logic block diagrams in the embodiments of the present disclosure can be implemented or executed. The general-purpose processor may be a microprocessor or the processor may be any conventional processor or the like. The steps of the method disclosed in connection with the embodiment of the present disclosure can be directly embodied in the execution completion of the hardware decoding processor, or by the combination of the hardware and software modules in the decoding processor. The software module can be located in random memory, flash memory, read-only memory, programmable read-only memory or electrically erasable programmable memory, register and other mature storage media in the art. The storage medium is located in the memory, and the processor reads the information in the memory and completes the steps of the above method in combination with its hardware.

It is to be understood that the memory in the embodiments of the present disclosure may be volatile memory or nonvolatile memory, or may include both volatile and nonvolatile memory. The nonvolatile memory can be read-only memory (ROM), programmable ROM (PROM), erasable Prom (EPROM), electrically erasable EPROM (EEPROM) or flash memory. Volatile memory can be random access memory (RAM), which is used as an external cache. Many forms of RAM are available, such as static RAM (SRAM), dynamic RAM (DRAM), synchronous DRAM (SDRAM), double data rate SDRAM (DDR SDRAM, enhanced SDRAM (ESDRAM), synchlink DRAM (SLDRAM) and direct Rambus RAM (DR RAM). It is to be noted that the memory of the systems and methods described herein is intended to include, but is not limited to, these and any other suitable types of memory.

It is to be understood that the above described memory is exemplary but not restrictive. For example, the memory in the embodiment of the present disclosure can also be static RAM (SRAM), dynamic RAM (DRAM), synchronous dynamic random access memory (synchronous DRAM (SDRAM), double data rate SDRAM (DDR SDRAM), enhanced SDRAM (ESDRAM), synchronous link DRAM (SLDRAM), direct RAM (DR RAM), etc. That is to say, the memory in the embodiments of the present disclosure is intended to include, but not limited to, these and any other suitable types of memory.

The embodiments of the present disclosure also provide a computer-readable storage medium for storing computer programs.

Optionally, the computer-readable storage medium can be applied to the network device in the embodiment of the present disclosure, and the computer program enables the computer to execute the corresponding processes implemented by the network device in the various methods of the embodiment of the present disclosure. For the sake of brevity, it will not be repeated here.

Optionally, the computer-readable storage medium can be applied to the mobile terminal/UE in the embodiment of the present disclosure, and the computer program enables the computer to execute the corresponding processes implemented by the mobile terminal/UE in the various methods of the embodiment of the present disclosure. For the sake of brevity, it will not be repeated here.

The embodiment of the present disclosure also provides a computer program product, including a computer program instruction.

Optionally, the computer program product can be applied to the network device in the embodiments of the present disclosure, and the computer program instruction enables the computer to execute the corresponding processes implemented by the network device in the various methods of the embodiment of the disclosure. For the sake of brevity, it will not be repeated here.

Optionally, the computer program product can be applied to the mobile terminal/UE in the embodiments of the present disclosure, and the computer program instruction enables the computer to execute the corresponding process implemented by the mobile terminal/UE in the various methods of the embodiment of the disclosure, for the sake of brevity, it will not be repeated here.

The embodiment of the present disclosure also provides a computer program.

Optionally, the computer program can be applied to the network device in the embodiments of the present disclosure. When the computer program runs on the computer, the computer executes the corresponding process realized by the network device in each method of the embodiment of the disclosure. For the sake of brevity, it will not be described here.

Optionally, the computer program can be applied to the mobile terminal/UE in the embodiments of the present disclosure. When the computer program runs on the computer, the computer executes the corresponding process realized by the mobile terminal/UE in the various methods of the embodiment of the disclosure. For the sake of brevity, it will not be elaborated here.

Those of ordinary skill in the art may realize that the unit and algorithm steps of each example described in combination with the disclosed embodiments herein can be realized by the combination of electronic hardware, or computer software and electronic hardware. Whether these functions are performed in hardware or software depends on the specific application and design constraints of the technical solution. A professional technician may use different methods to implement the described functions for each specific application, but such implementation shall not be considered beyond the scope of the present disclosure.

Those skilled in the art can clearly understand that for the convenience and simplicity of the description, the specific working process of the system, device and unit described above can refer to the corresponding process in the embodiment of the method described above, and will not be described here.

In several embodiments provided by the present disclosure, it should be understood that the disclosed systems, devices and methods can be realized in other ways. For example, the embodiment of the device described above is only schematic. For example, the division of the unit is only a logical function division, and there can be another division method in actual implementation, for example, multiple units or components can be combined or integrated into another system, or some features can be ignored or not implemented. On the other hand, the mutual coupling or direct coupling or communication connection illustrated or discussed can be indirect coupling or communication connection through some interfaces, devices or units, and can be electric, mechanical or other forms.

The unit described as a separation part may or may not be physically separated, and the unit displayed as a unit may or may not be a physical unit, that is, it may be located in one place, or it may be distributed to multiple network units. Some or all of the units can be selected according to the actual needs to achieve the purpose of the embodiment.

In addition, each functional unit in each embodiment of the present disclosure may be integrated in one processing unit, each unit may exist physically alone, or two or more units may be integrated in one unit.

If the function is realized in the form of a software function unit and sold or used as an independent product, it can be stored in a computer readable storage medium. Based on such understanding, the technical solution of the present disclosure, in essence or in the form of a software product, which is stored in a storage medium, includes several instructions for making a computer device (which can be a personal computer, a server, a network device, etc.) to perform all or part of the steps of the method according to each embodiment of the present disclosure. The aforementioned storage media include: U disk, mobile hard disk, read-only memory (ROM), random access memory (RAM), disk or optical disk and other media that can store program code.

The above is only the specific embodiments of the disclosure, but the scope of protection of the disclosure is not limited to this. Any person skilled in the technical field who can easily think of change or replacement within the technical scope of the disclosure shall be covered in the scope of protection of the disclosure. Therefore, the protection scope of the disclosure shall be subject to the protection scope of the claims.

The invention claimed is:

1. A method for configuring a measurement gap, comprising:
   reporting, by a terminal, capability information of the terminal to a network device; wherein the capability information of the terminal is used for indicating whether the terminal supports capability of performing independent gap measurement within different frequency ranges and whether the terminal supports capability of no measurement gap; and wherein the capability information of the terminal is 1-bit information, and when a value of the capability information is a first value, the terminal supports the capability of no measurement gap, and when the value of the capability information is a second value, the terminal does not support the capability of no measurement gap;
   receiving, by the terminal, first configuration information from a network device; and determining, by the terminal, a measurement gap corresponding to the capability information of the terminal based on the first configuration information, wherein the first configuration information comprises first indication information used for indicating no measurement gap; and the first configuration information is used for indicating an object to be measured corresponding to no measurement gap; or wherein the terminal supports a first dual connectivity mode where radio access technologies of a master node and a secondary node are a first radio access technology and a second radio access technology, respectively; and the object to be measured is a cell within a first frequency range; or the terminal supports a second dual connectivity mode where radio access technologies of a master node and a secondary node are a second radio access technology and a first radio access technology, respectively; and the object to be measured is a cell within a first frequency range, or the object to be measured is at least one of a cell with a first radio access technology or a cell within a second frequency range.

2. The method of claim 1, wherein the terminal supports a stand alone mode, and the object to be measured is a cell within a first frequency range; or, the terminal supports a stand alone mode, and the object to be measured is at least one of a cell with a first radio access technology or a cell of within second frequency range.

3. The method of claim 1, wherein receiving, by the terminal, the first configuration information from the network device comprises:

receiving, by the terminal, a radio resource control (RRC) reconfiguration message from a serving cell, the RRC reconfiguration message being used for indicating the first configuration information.

4. The method of claim 3, wherein the RRC reconfiguration message is an RRC reconfiguration message in a secondary node addition procedure or an RRC reconfiguration message in a cell handover procedure.

5. A method for configuring a measurement gap, comprising:

receiving, by a network device, capability information of a terminal from the terminal; wherein the capability information of the terminal is 1-bit information, and when a value of the capability information is a first value, the terminal supports the capability of no measurement gap, and when the value of the capability information is a second value, the terminal does not support the capability of no measurement gap;

generating, by the network device, first configuration information based on the capability information of the terminal; and sending, by the network device, the first configuration information to the terminal, the first configuration information being used for determining a measurement gap corresponding to capability information of the terminal, wherein the capability information of the terminal is used for indicating whether the terminal supports capability of performing independent gap measurement within different frequency ranges and whether the terminal supports capability of no measurement gap, and the first configuration information comprises first indication information used for indicating no measurement gap;

wherein the first configuration information is used for indicating an object to be measured corresponding to no measurement gap; and wherein the terminal supports a first dual connection mode where radio access technologies of a master node and a secondary node are a first radio access technology and a second radio access technology, respectively; and the object to be measured is a cell within a first frequency range; or the terminal supports a second dual connectivity mode where radio access technologies of a master node and a secondary node are a second radio access technology and a first radio access technology, respectively; and the object to be measured is a cell within a first frequency range, or the object to be measured is at least one of a cell with a first radio access technology or a cell within a second frequency range.

6. The method of claim 5, wherein the terminal supports a stand alone mode, and the object to be measured is a cell within a first frequency range; or, the terminal supports a stand alone mode, and the object to be measured is at least one of a cell with a first radio access technology or a cell of within second frequency range.

7. The method of claim 5, wherein sending, by the network device, first configuration information to the terminal comprises:

sending, by the network device, a radio resource control (RRC) reconfiguration message to the terminal, the RRC reconfiguration message being used for indicating the first configuration information.

8. The method of claim 7, wherein the RRC reconfiguration message is an RRC reconfiguration message in a secondary node addition procedure or an RRC reconfiguration message in a cell handover procedure.

9. A device for configuring a measurement gap, applied to a network device, comprising:

a memory storing processor-executable instructions; and a processor configured to execute the stored processor-executable instructions to perform an operation of:

receiving capability information of a terminal from the terminal; wherein the capability information of the terminal is 1-bit information, and when a value of the capability information is a first value, the terminal supports the capability of no measurement gap, and when the value of the capability information is a second value, the terminal does not support the capability of no measurement gap;

generating first configuration information based on the capability information of the terminal; and sending the first configuration information to the terminal, the first configuration information being used for determining a measurement gap corresponding to capability information of the terminal, wherein the capability information of the terminal is used for indicating whether the terminal supports capability of performing independent gap measurement within different frequency ranges and whether the terminal supports capability of no measurement gap, and the first configuration information comprises first indication information used for indicating no measurement gap;

wherein the first configuration information is used for indicating an object to be measured corresponding to no measurement gap; and wherein the terminal supports a first dual connection mode where radio access technologies of a master node and a secondary node are a first radio access technology and a second radio access technology, respectively; and the object to be measured is a cell within a first frequency range; or the terminal supports a second dual connectivity mode where radio access technologies of a master node and a secondary node are a second radio access technology and a first radio access technology, respectively; and the object to be measured is a cell within a first frequency range, or the object to be measured is at least one of a cell with a first radio access technology or a cell within a second frequency range.

10. The device of claim 9, wherein the terminal supports a stand alone mode, and the object to be measured is a cell within a first frequency range; or, the terminal supports a stand alone mode, the object to be measured is at least one of a cell with a first radio access technology or a cell of within second frequency range.

11. The device of claim 9, wherein the sending unit is configured to send a radio resource control (RRC) reconfiguration message to the terminal, the RRC reconfiguration message being used for indicating the first configuration information.

* * * * *